Aug. 11, 1931.     M. A. KAPELUCHNIKOFF     1,817,986
BORING APPLIANCE
Filed March 6, 1931
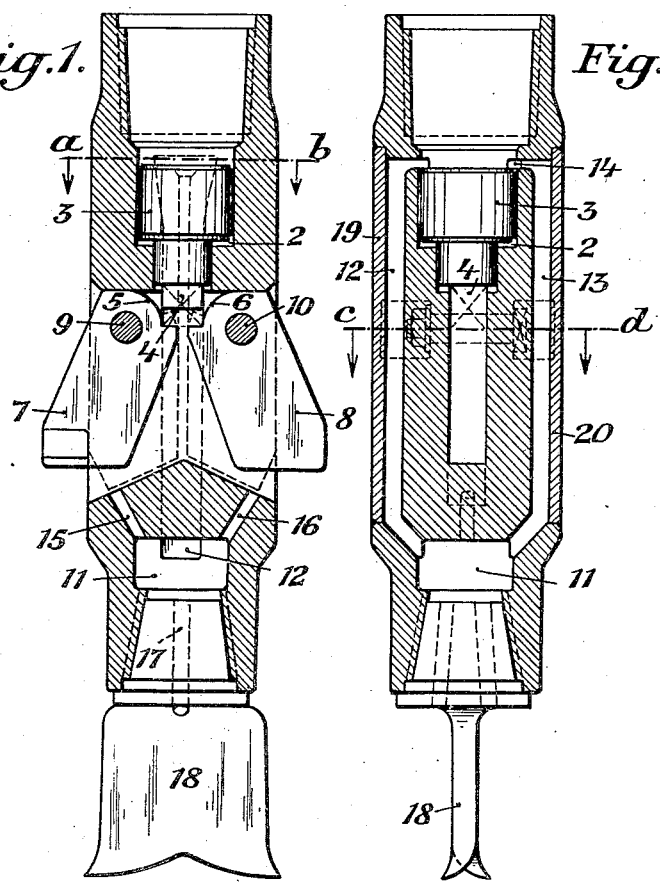
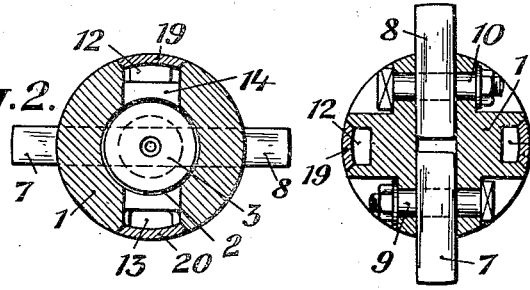
INVENTOR:
M. A. Kapeluchnikoff
BY Emil Bönnelycke
ATTORNEY.

Patented Aug. 11, 1931

1,817,986

UNITED STATES PATENT OFFICE

MATHIEU ALKUNOWITSCH KAPELUCHNIKOFF, OF BAKU, RUSSIA

BORING APPLIANCE

Application filed March 6, 1931, Serial No. 520,662, and in Germany March 3, 1930.

This invention relates to boring appliances having expansible boring tools. Boring tools of this kind are usually lubricated by the water serving to drive the motor, whereby the water, after leaving the motor, flows through passages or channels which are controlled by the piston used for spreading the tools. The arrangement in this case is such, that the tools are pivoted to the lower end of a cutter head to be connected to the lower end of the boring tube and carry toothed segments which cooperate with teeth provided at the lower end of the movable piston. The water for lubricating the cutting edges of the tools may reach the tools only after they have occupied the working or operating position.

Now the object of the present invention is to provide a device for spreading the boring tools the construction of which is very simple and by means of which the tools are positively held in working or operating position. Another object of the invention is to provide for a lubrication of the cutting edges of these tools in the moment the tools begin to spread.

The new boring appliance is characterized by the fact that in the cutter head, having a cross-shaped cross section for the greater part of its length, a piston is movably arranged in a chamber provided above the boring tools the lower end of which piston directly acts upon the tools for spreading them, whereas the upper end of said piston controls an annular passage or channel connected to straight passages or channels of relatively great cross section leading to a second chamber arranged below said tools which chamber is connected by means of passages or channels at the one hand to a chisel at the lower end of the cutter head and at the other hand to the expansible tools.

One constructional example of the invention is illustrated in the accompanying drawings in which Fig. 1 is a longitudinal section through the cutter head, Fig. 2 shows a section on line a—b of Fig. 1, Fig. 3 is a section similar to that of Fig. 1 but turned about an angle of 90° and Fig. 4 shows a cross section on line c—d of Fig. 3.

The cutter head which is to be connected to the lower end of the boring tube has for the greater part of its length, as shown in Fig. 4, a cross-shaped cross section. Near the upper end of the cutter head a chamber 2 is provided for the reception of a piston 3 the lower offset portion 4 of which is square-shaped and engages cam faces 5, 6 of the expansible boring tools 7, 8. The parts 7, 8 of the tool are pivoted to studs 9, 10 and usually occupy the position shown in Fig. 1 in which they act to force the piston 3 upwardly. Below the tools 7, 8 a chamber 11 is provided in the cutting head and this chamber communicates, by means of passages or channels 12, 13 of relatively great cross-section and an annular passage or channel 14, with the chamber 2 in the upper part of the cutter head. Passages or channels 15, 16 lead to slots in the cutter head which receive the parts 7, 8 of the tool when these are in the inoperative position. Other passages 17 connect the chamber 11 with the chisel 18 at the lower end of the cutter head. The passages 12 and 13 are preferably made by providing longitudinal slots at diametrically opposite portions to the upper edges of the walls of which strips or plates 19, 20 are welded.

In operation the piston 3 is, as soon as the water flows into the boring tube and cutter head, depressed, so that the annular passage or channel 14 begins to open and the water flows through the passages or channels 12, 13 to the second chamber 11. Simultaneously pressure is exerted by the square end 4 of the piston 4 upon the cam faces 5, 6 of the tool parts 7, 8 which therefore turn about their pivots 9, 10, so that the tools are brought into the operative position. The water arriving by way of the passages 12, 13 in the chamber 11 flows through the passages 15, 16 to the tool parts and through the passages 17 to the chisel 18. All operating parts are, in this manner, at the start of the operation positively lubricated, whereas the spreading of the tool parts 7, 8 is effected positively also.

As soon as the motor of the boring appliance is started, the water passes from the bottom of the hole to the surface, so that the attendant may at once ascertain whether or not the device is operating properly.

What I claim is:

1. A boring tool for sinking shafts comprising, in combination, a cutter head having a cross-shaped cross section for the greater part of its length, a piston movable in a chamber provided in said cutter head, a chisel located at the lower end of said cutter head and expansible boring tools pivoted to said cutter head below said chamber, said piston having at its lower end a square-shaped portion cooperating with cam faces of said expansible boring tools, an annular passage being provided in said cutter head controlled by said piston and connected by straight longitudinal passages to a second chamber provided in said cutter head below said boring tools, said second chamber communicating by passages in said cutter head with recesses in said cutter head for the reception of said boring tools in inoperative position and with said chisel at the lower end of said cutter head.

2. In a boring tool as claimed in claim 1 in which said passages connecting said chambers in said cutter head are formed by longitudinal slots provided in said cutter head at diametrically opposite portions which slots are closed by plates welded to the upper edges of the walls of said slots.

In testimony whereof I have affixed my signature.

MATHIEU ALKUNOWITSCH KAPELUCHNIKOFF.